(12) United States Patent
Roche et al.

(10) Patent No.: US 12,252,049 B2
(45) Date of Patent: Mar. 18, 2025

(54) METHOD FOR ASSEMBLING A TUBE IN A FRAME PART OF A VEHICLE SEAT AND ASSEMBLY OF A TUBE IN A FRAME PART OF A VEHICLE SEAT

(71) Applicant: FAURECIA Sièges d'Automobile, Nanterre (FR)

(72) Inventors: Sylvain Roche, Varennes Changy (FR); David Epaud, Lardy (FR); Farouk Bouzid, Bretigny sur Orge (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 285 days.

(21) Appl. No.: 17/715,225

(22) Filed: Apr. 7, 2022

(65) Prior Publication Data
US 2022/0324361 A1 Oct. 13, 2022

(30) Foreign Application Priority Data

Apr. 8, 2021 (FR) ........................................ 2103603

(51) Int. Cl.
*B60N 2/68* (2006.01)
(52) U.S. Cl.
CPC .................................. *B60N 2/682* (2013.01)
(58) Field of Classification Search
CPC ................................. B60N 2/682; B60N 2/68
See application file for complete search history.

(56) References Cited

U.S. PATENT DOCUMENTS

| | | | | |
|---|---|---|---|---|
| 8,985,696 B2* | 3/2015 | Yasuda | ..................... | B60N 2/68 297/452.36 |
| 10,988,058 B1* | 4/2021 | Bharsakale | ............ | B60N 2/015 |
| 11,135,953 B2* | 10/2021 | Kong | ..................... | B60N 2/682 |
| 2012/0068506 A1* | 3/2012 | Yamaki | ................ | B60N 2/4235 297/216.1 |
| 2015/0091359 A1* | 4/2015 | Kitou | ..................... | B60N 2/682 297/452.18 |
| 2018/0201169 A1* | 7/2018 | Hashimoto | ............ | B21D 53/88 |
| 2018/0334065 A1* | 11/2018 | Suzuki | ..................... | B60N 2/68 |

FOREIGN PATENT DOCUMENTS

| | | | | |
|---|---|---|---|---|
| DE | 102004049359 A1 | | 4/2006 | |
| DE | 102007051761 A1 | | 4/2009 | |
| DE | 102009035405 A1 | * | 2/2010 | ............... B60N 2/68 |
| DE | 202009017479 U1 | * | 4/2010 | ............... B60N 2/68 |
| DE | 102018207764 A1 | | 11/2018 | |
| EP | 2572931 A1 | | 3/2013 | |
| FR | 2886357 A1 | * | 12/2006 | ............. B60N 2/015 |
| FR | 3125486 A1 | * | 1/2023 | |

(Continued)

*Primary Examiner* — Timothy J Brindley
(74) *Attorney, Agent, or Firm* — Barnes & Thornburg LLP

(57) ABSTRACT

A method for assembling a tube into a frame part of a vehicle seat comprises the steps of: i) providing a tube such that a first free end of a first side of an end portion of the tube is offset longitudinally relative to a second free end of a second side of the end portion; ii) providing a frame part in the form of a metal plate; iii) arranging the first and second free ends of the tube in contact with the frame part, in two longitudinally offset areas of contact; and iv) successively creating, by means of a same laser, a weld at the first and second areas of contact.

24 Claims, 9 Drawing Sheets

(56) References Cited

FOREIGN PATENT DOCUMENTS

| JP | 11216037 | A | * | 8/1999 | ............... | B60N 2/68 |
| JP | 2014218155 | A | * | 11/2014 | ............... | A47C 7/38 |
| JP | 2015067133 | A |  | 4/2015 |  |  |
| WO | WO-2004086909 | A1 | * | 10/2004 | ........... | B60N 2/4228 |
| WO | WO-2006055616 | A1 | * | 5/2006 | ............. | B60N 2/682 |
| WO | WO-2009056294 | A1 | * | 5/2009 | ............... | B60N 2/68 |
| WO | WO-2021039908 | A1 | * | 3/2021 | ........... | B60N 2/5621 |

* cited by examiner

METHOD FOR ASSEMBLING A TUBE IN A FRAME PART OF A VEHICLE SEAT AND ASSEMBLY OF A TUBE IN A FRAME PART OF A VEHICLE SEAT

PRIORITY CLAIM

This application claims priority to French Patent Application No. FR2103603, filed Apr. 8, 2021, which is expressly incorporated by reference herein.

BACKGROUND

The present disclosure relates to a method for assembling a tube in a frame part of a vehicle seat, in particular of a motor vehicle seat. Also described is a method of manufacturing a vehicle seat backrest making use of this method for assembling a tube in a frame part of a vehicle seat. Also described is an assembly of a tube in a frame part of a vehicle seat, in particular of a motor vehicle seat, a backrest comprising such an assembly, and a vehicle seat, in particular a motor vehicle seat, comprising such a backrest.

SUMMARY

According to the present disclosure, a method of assembling a tube into a frame part of a vehicle seat comprises the steps of:

i) providing a tube extending mainly along the direction of a longitudinal axis of the tube, an end portion of the tube being such that a first free end of a first side of the end portion is offset along the direction of the longitudinal axis of the tube, relative to a second free end of a second side of the end portion;

ii) providing a frame part in the form of a shaped metal plate;

iii) arranging the tube in contact with the frame part, so that:
  the first side of the end portion of the tube and a first surface of the frame part define a first area of contact of the tube with the frame part, near the first free end, and
  the second side of the end portion of the tube and a second surface of the frame part define a second area of contact of the tube with the frame part, near the second free end, the first and second areas of contact of the tube with the frame part being offset relative to each other, along the direction of the longitudinal axis of the tube;

iv) successively creating, by means of a same laser, a first weld at the first area of contact then a second weld at the second area of contact.

In illustrative embodiments, the first and second contact surface, where the welds are made, can be more easily accessible by a laser beam.

In illustrative embodiments, the method comprises one or more of the following features, taken alone or in combination:
  at least the end portion of the tube is of polygonal section, in particular rectangular, more particularly square;
  the laser is moved between the first and the second weld within a half-space delimited by an extension plane of the first or second side;
  between the first weld and the second weld, the laser is moved relative to the tube and to the frame part, by translational movement(s) only;
  the first and second sides are parallel;
  the face of the first side in contact with the first surface and the face of the second side in contact with the second surface have the same orientation;
  the second surface is on a ramp of the frame part, the ramp being inclined relative to the direction of the longitudinal axis of the tube;
  the frame part has a hole in a face of the frame part, substantially normal to the direction of the longitudinal axis of the tube, the hole being shaped to receive at least one among the first free end of the first side of the tube and the second free end of the second side of the tube, the hole preferably being shaped to receive only one among the first free end of the first side and the second free end of the second side of the tube;
  the first and second surfaces extend one on either side of the hole, along the direction of the longitudinal axis of the tube;
  the ramp is divergent in the direction of insertion of the tube into the hole of the frame part;
  in step iii), a laser beam is emitted on a side of the tube each time, the thickness of the first and second sides of the tube being less than the thickness of the frame part at the first and second surfaces respectively; and
  the frame part is a flange or a hinge gusset plate, of a vehicle seat backrest.

In illustrative embodiments, a method of manufacturing a vehicle seat backrest is described, comprising the steps of:
  a) providing at least two uprights, an upper crosspiece and/or a lower crosspiece, two frame parts, and a tube,
  b) assembling the tube to at least one among the two frame parts, by implementing a method as described above in all its combinations;
  c) assembling together the uprights, the upper crosspiece and/or the lower crosspiece, and the two frame parts.

In illustrative embodiments, in step c), a plate is also fixed to the uprights and/or to the upper crosspiece and/or to the lower crosspiece, preferably by laser welding.

According to another aspect, also described is an assembly of a tube into a frame part of a vehicle seat, comprising:
  a tube extending mainly along a direction of a longitudinal axis of the tube, an end portion of the tube being such that a first end of a first side of the end portion is offset along the direction of the longitudinal axis of the tube, relative to a second end of a second side of the end portion,
  a frame part of a vehicle seat, in the form of a shaped metal plate, the frame part defining a first surface and a second surface which are distinct,
  the tube and the frame part being shaped to define a first area of contact of the first side with the first surface near the first end and a second area of contact of the second side with the second surface near the second end,
  the tube and the frame part being fixed together by laser welding at least at the first area of contact and at a second weld at the second area of contact.

In illustrative embodiments, the assembly comprises one or more of the following features, taken alone or in combination:
  the tube and the frame part are shaped so that the first area of contact of the first side with the first surface and the second area of contact of the second side with the second surface are reachable by a laser beam emitted from a same half-space delimited by an extension plane of the first or second side;
  at least the end portion of the tube is of polygonal section, in particular rectangular, more particularly square;
  the first and second sides are parallel;

the first and second welds are parallel;

the face of the first side in contact with the first surface and the face of the second side in contact with the second surface have the same orientation;

the second surface is on a portion of the frame part forming a ramp, inclined relative to the direction of the longitudinal axis of the tube;

the frame part has a hole in a face of the frame part, substantially normal to the direction of the longitudinal axis of the tube, the hole receiving at least one among the first end of the first side of the tube and the second end of the second side of the tube, the hole preferably receiving only one among the first end of the first side and the second end of the second side of the tube;

the first and second surfaces extend one on either side of the hole, along the direction of the longitudinal axis of the tube; and the frame part is a flange of a backrest or a gusset plate of a hinge of a vehicle seat backrest.

In illustrative embodiments, a vehicle seat backrest is described, comprising at least two uprights, and an upper crosspiece and/or a lower crosspiece, two frame parts, and a tube assembled together, at least one frame part and the tube forming an assembly as described above, in all its combinations.

In illustrative embodiments, a vehicle seat is described comprising a seating portion and a backrest as described above, in all its combinations, the backrest being fixed to the seating portion.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 schematically represents a side view of an exemplary vehicle seat;

FIG. 2 schematically represents a perspective view of the backrest of the exemplary vehicle seat of FIG. 1;

Figure 6:
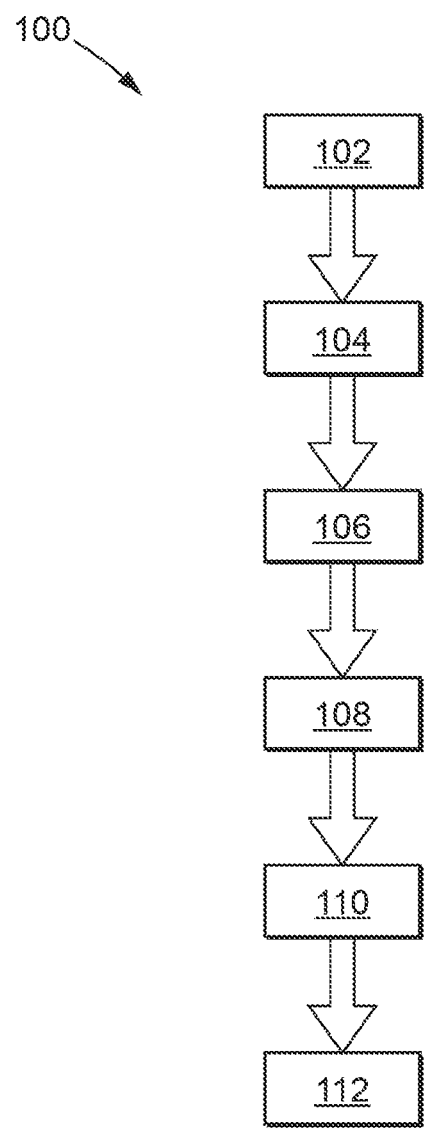
FIG. 6 is a flowchart of an exemplary method of manufacturing the backrest frame of the vehicle seat of FIG. 1.
Figure 7:
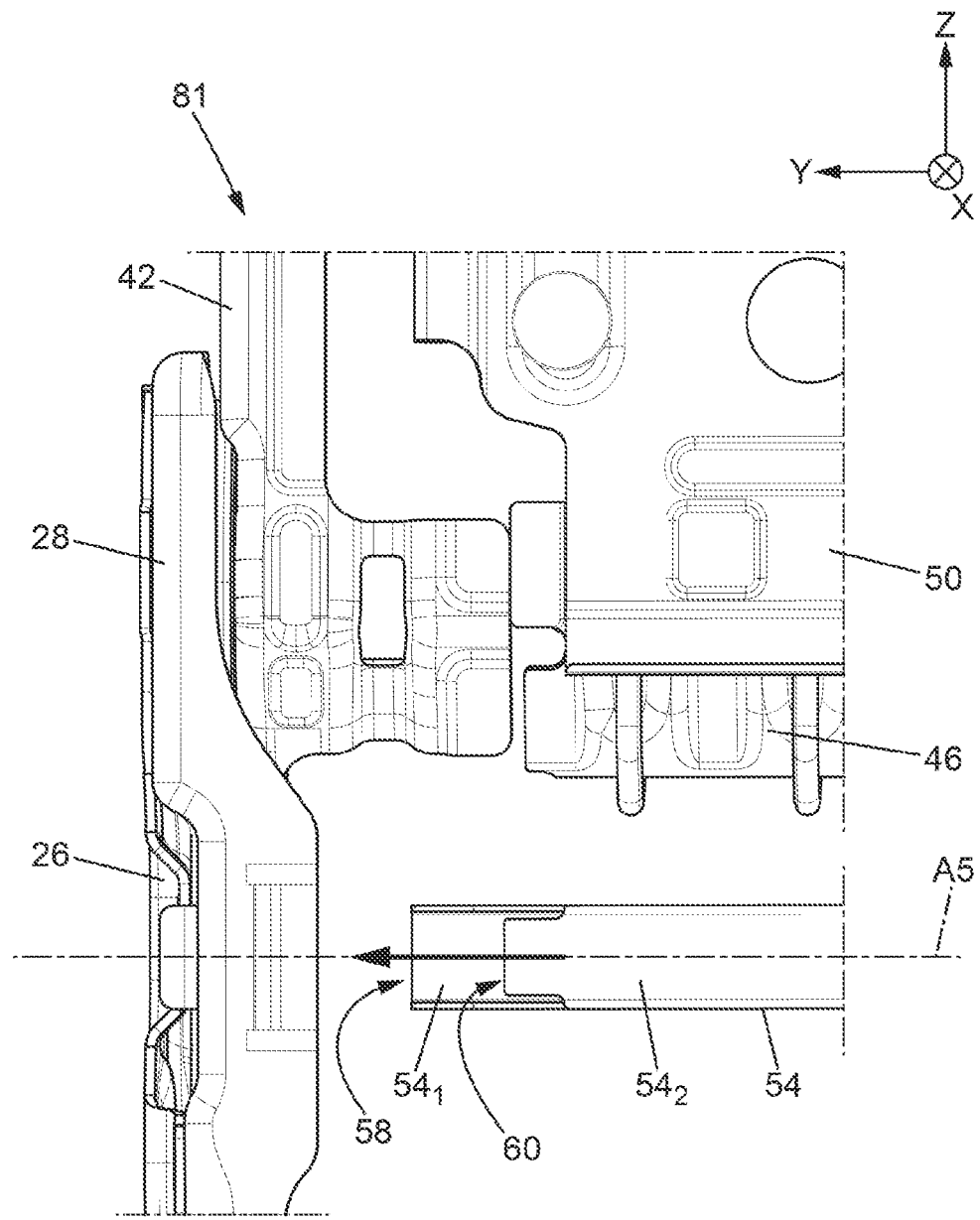
Figure 8:
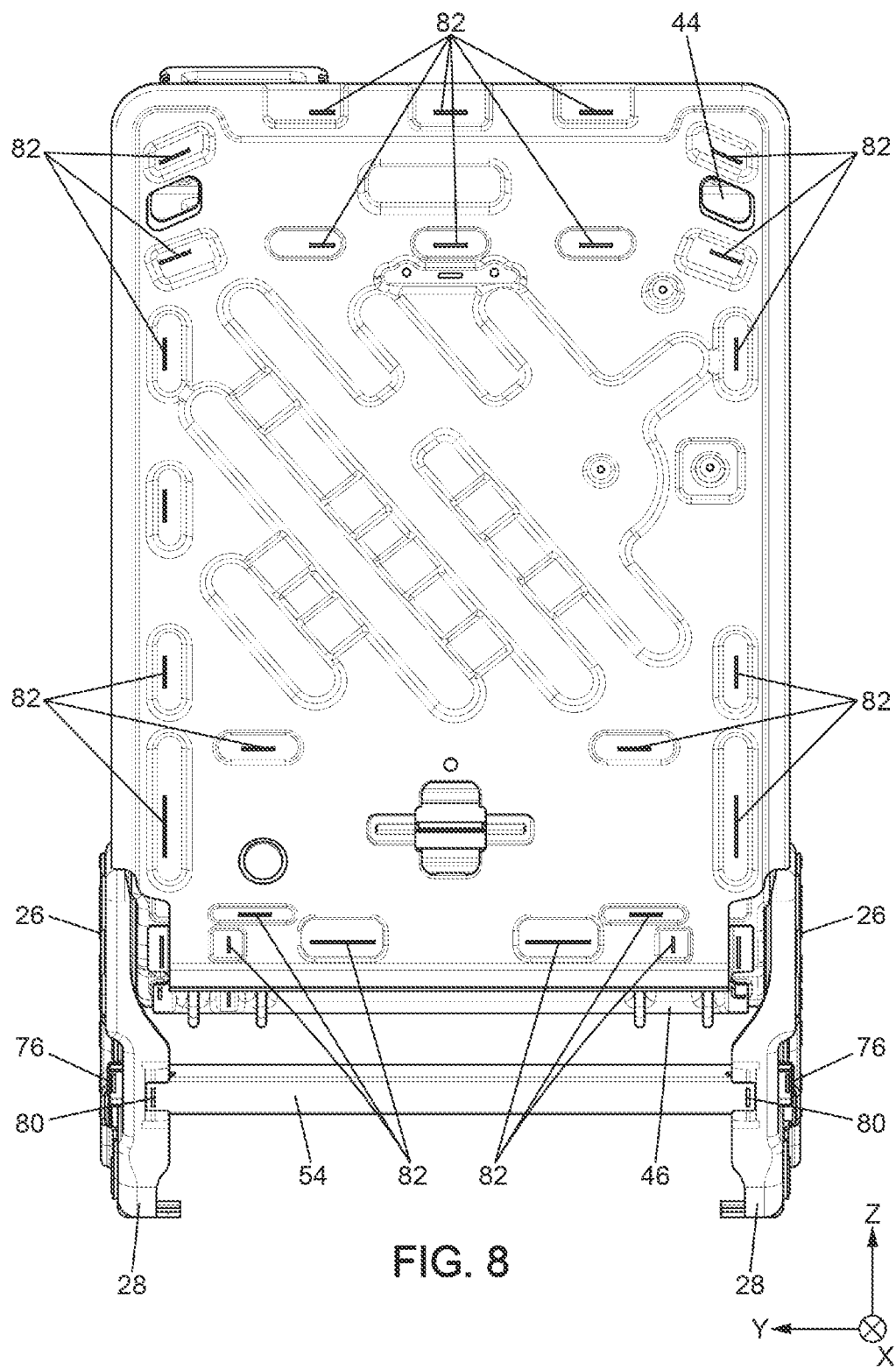
Figure 9:
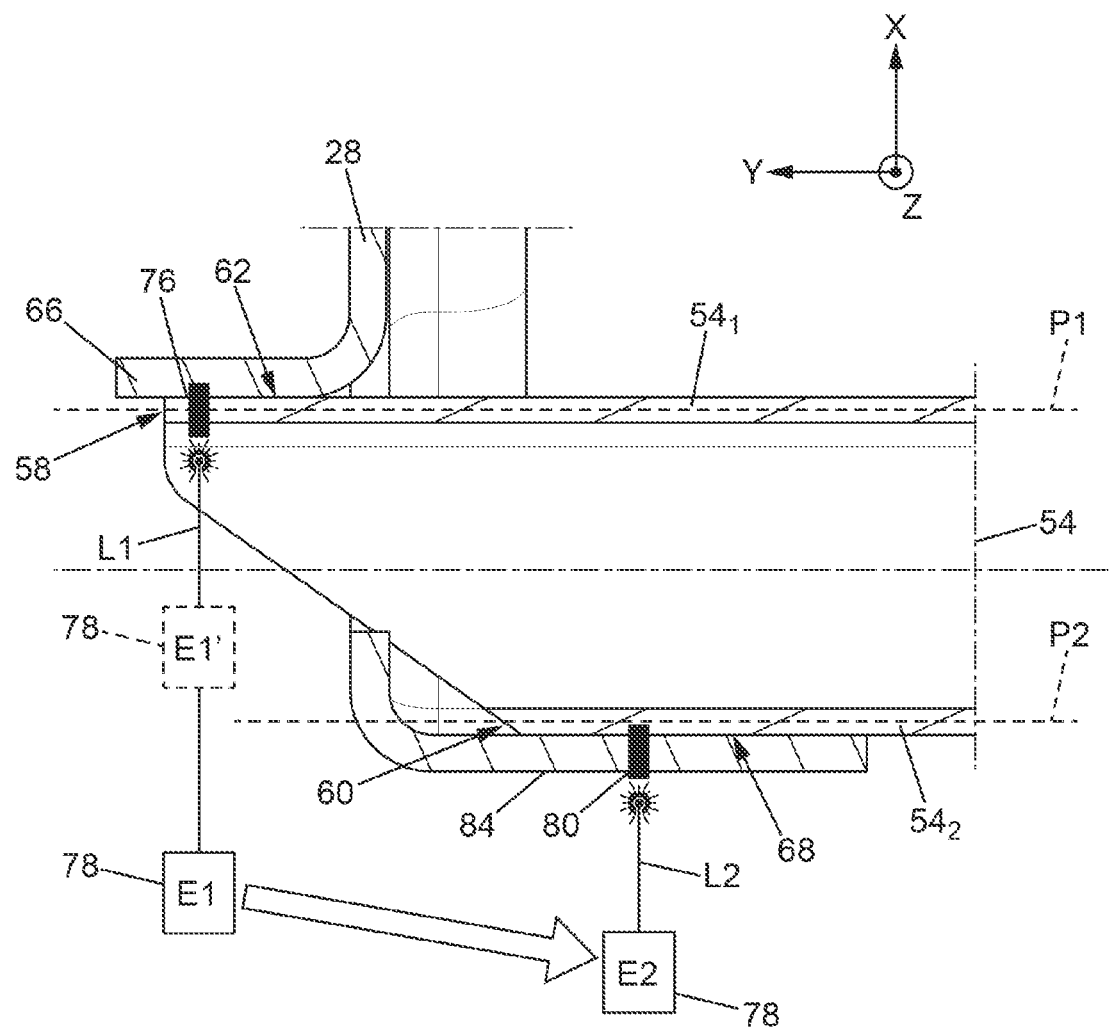

FIG. 7 schematically illustrates a first step of the method of FIG. 6;

FIG. 8 schematically illustrates a different step of the method of FIG. 6, than FIG. 7; and FIG. 9 schematically illustrates another example of a vehicle seat backrest and a step in the manufacturing method of this other example of a vehicle seat backrest.

DETAILED DESCRIPTION

In the various figures, the same references designate identical or similar elements. For conciseness, only those elements which are useful to understanding the described embodiment are shown in the figures and are described in detail below.

In the following description, when referring to absolute position qualifiers, such as the terms "front", "rear", "top", "bottom", "left", "right", etc., or relative qualifiers, such as the terms "above", "below", "upper", "lower", etc., or to orientation qualifiers, such as "horizontal", "vertical", etc., unless otherwise specified these are in reference to the orientation of the figures or of a vehicle seat in its normal position of use.

In particular, the longitudinal direction X means the longitudinal direction of the seat. The longitudinal direction X of the seat is considered to be the same as the longitudinal direction of the motor vehicle in which the seat is mounted. This longitudinal direction X corresponds to the normal direction of travel of the vehicle. The longitudinal direction X is horizontal. The transverse direction Y of the seat thus corresponds to the transverse or lateral direction of the motor vehicle. This transverse direction corresponds to a direction perpendicular to the normal direction of travel of the vehicle. The transverse direction Y is horizontal. Finally, the vertical direction Z is a vertical direction of the seat, perpendicular to the longitudinal and transverse directions.

Figure 1:
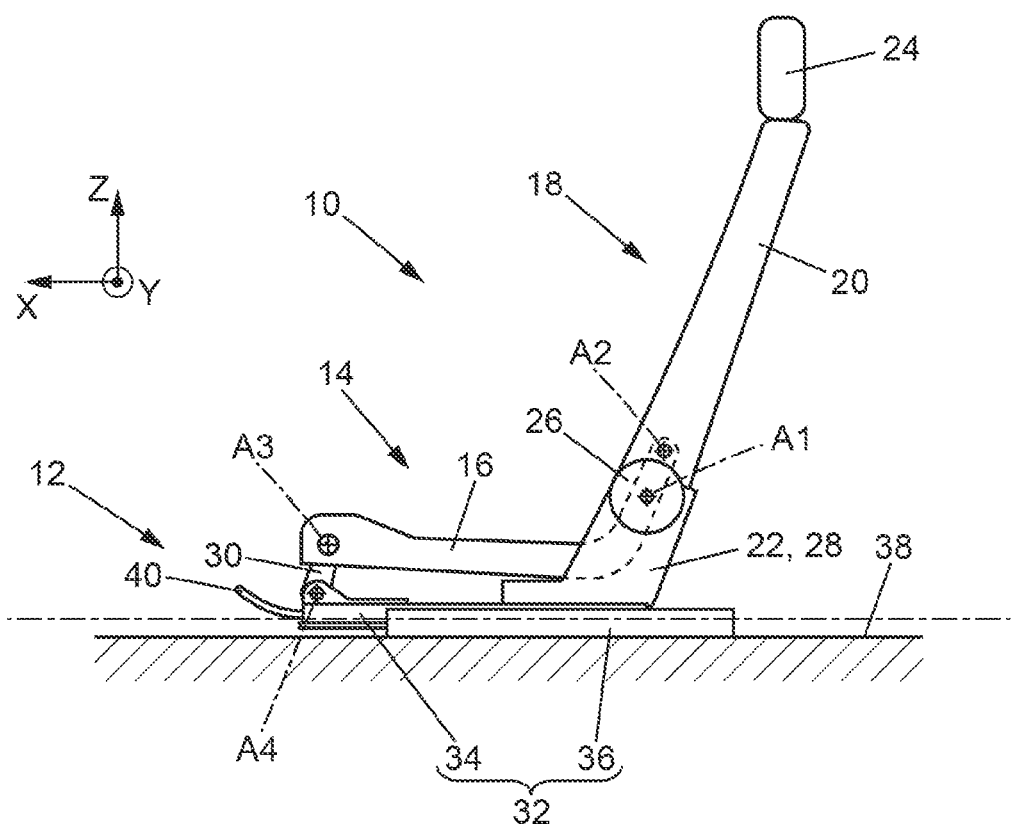
Figure 2:
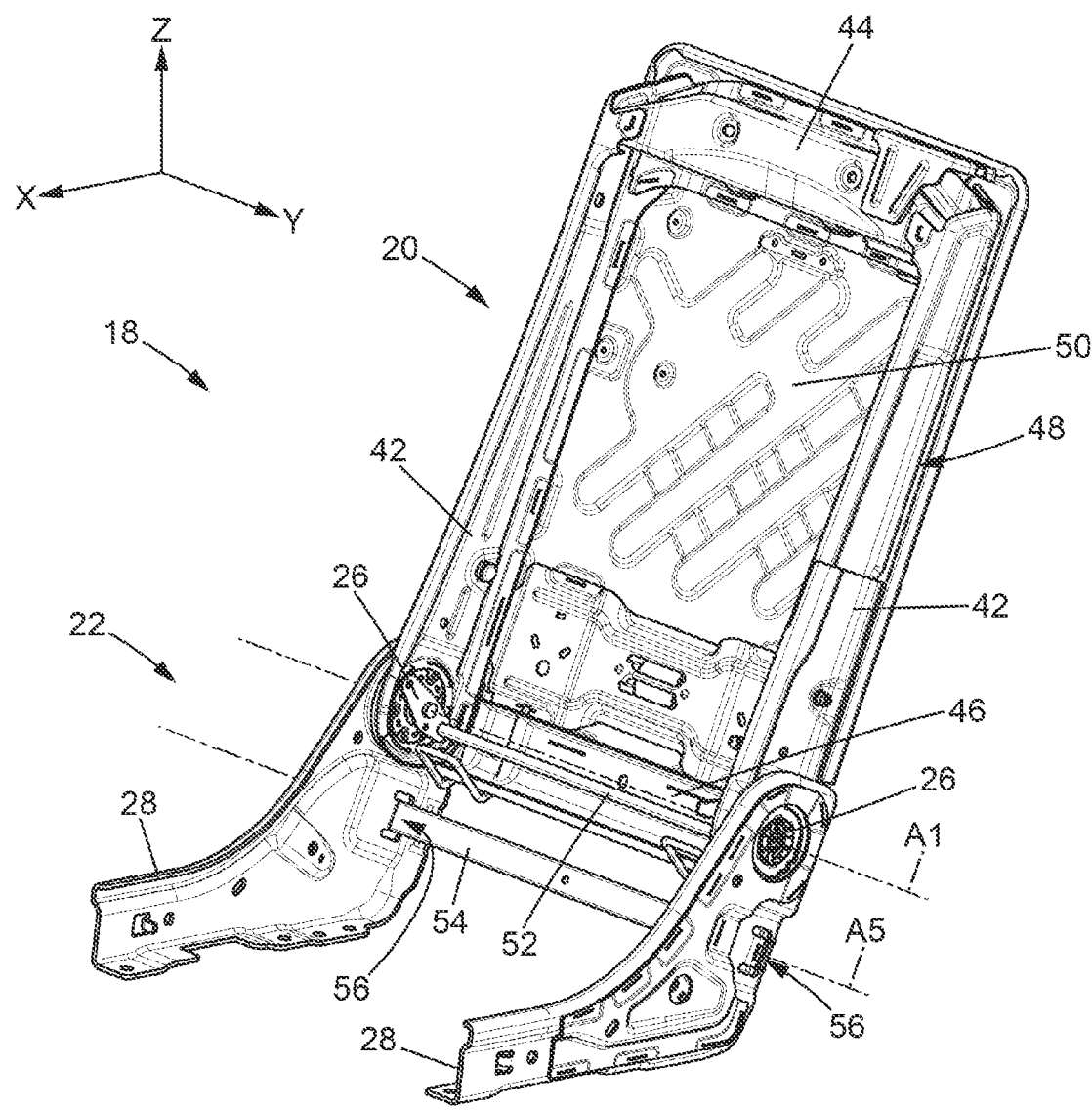
Figure 3:
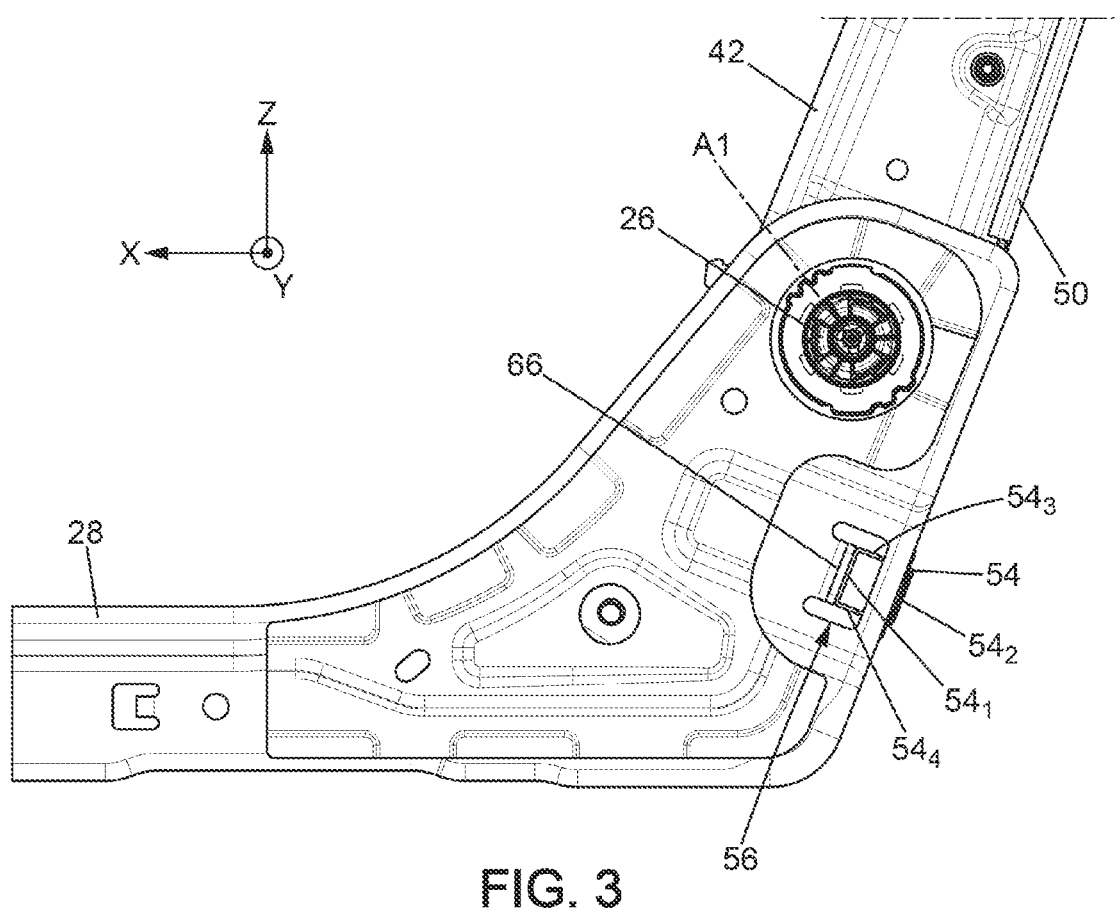
FIG. 3 shows a side view of details of the backrest of FIG. 2.

FIG. 1 schematically represents a vehicle seat 10, in particular a motor vehicle seat, mounted on a slide mechanism 12.

The seat 10 illustrated in FIG. 1 comprises a seating portion 14, with a seating portion frame 16, a backrest 18, with a backrest frame 20 and a base 22, and a headrest 24. The backrest frame 20 here is pivoting about a first transverse axis A1, relative to the base 22. To do so, a hinge mechanism 26 is provided on each side of the seat 10, between the backrest frame 20 and the one of the two hinge gusset plates 28 forming the base 22 in the example shown.

The seating portion frame 16 is mounted so as to pivot relative to the backrest frame 20 about a second transverse axis A2. In addition, near its front end, the seating portion frame 16 is mounted so as to pivot about a third transverse axis A3, relative to a connecting rod 30 arranged on each side of the seat 10. Each connecting rod 30 is mounted so as to pivot about a fourth transverse axis A4 relative to one of the slides 32 of the slide mechanism 12. More specifically, each connecting rod 30 is mounted so as to pivot about the fourth transverse axis A4 relative to the movable profile 34 of a respective slide 32.

Each movable profile 34 is part of a respective slide 32 and is associated with a fixed profile 36. The fixed profile 36 is also called a rail or female profile. The fixed profile 36 is fixed to the floor 38 of the motor vehicle.

In this example, the seat 10 comprises a manual control element 40, called a release bar, for controlling the sliding of the slides 32. This manual control element 40 allows in particular locking and unlocking the systems for stopping the sliding of the movable profiles 34 relative to the respective fixed profiles 36. Once these stop systems have been unlocked, the manual control element 40 can also be used as a gripping element, to cause the movable profiles 34 to slide relative to their respective fixed profiles 36 of the slide 32, in the longitudinal direction X. The fixed 36 and movable 34 profiles of the slides 32 are generally made of metal.

Alternatively, the movement of the movable profiles 34 relative to the fixed profiles 36 is controlled by means of one or more actuators.

In the following, we will focus more particularly on the backrest 18 of the seat 10, as illustrated by FIGS. 2 to 5.

As indicated above, the backrest 18 comprises a backrest frame 20 and a base 22. The base 22 makes it possible to fix the backrest frame 20 to the movable profiles 34 of the slides 32. More specifically, each hinge gusset plate 28 is fixed to the movable profile 34 of a respective slide 32. A lock may be provided to selectively lock/unlock the base 22 and therefore the backrest 18 with respect to the movable profiles 34 of the slides 32.

The backrest frame 20 comprises in particular, according to the example illustrated, two uprights 42, an upper crosspiece 44, and a lower crosspiece 46. The two uprights 42, the upper crosspiece 44, and the lower crosspiece 46 are fixed together here to form a framework 48. The framework 48 is substantially rectangular here. The backrest frame 20 further comprises, in the example of FIG. 2, a metal plate 50 fixed to the framework 48.

The two hinge mechanisms 26 are connected together by a rod 52 enabling the two hinge mechanisms 26 to be controlled simultaneously.

Furthermore, the two hinge gusset plates 28 are connected together by a crosspiece 54. Here the crosspiece is formed by a tube 54. The tube 54 extends mainly along an axis A5, transverse to the seat 10. Thus, the longitudinal direction of the tube 54 (or direction of the longitudinal axis A5 of the tube 54) mounted on the seat 10 corresponds substantially to the transverse direction Y of the seat 10.

Here the tube 54 has a polygonal section, more precisely rectangular, even more precisely square. The tube 54 thus has four sides $54_1$, $54_2$, $54_3$, $54_4$, with parallel pairs. Side is understood to mean a side of the tube 54, the wall forming this side of the tube 54. Each side $54_1$, $54_2$, $54_3$, $54_4$ is thus in three dimensions, even if one of its dimensions is in principle much smaller than the other two, in particular at least ten times smaller, preferably at least one hundred times smaller than the other two.

The tube 54 is received, at each of these two longitudinal ends, in a hole 56 in a respective hinge gusset plate 28. As is more particularly visible in FIG. 3, the hole 56 here has a "U" section to facilitate the formation of the folded tongue 66, described below, by stamping.

Figure 4:
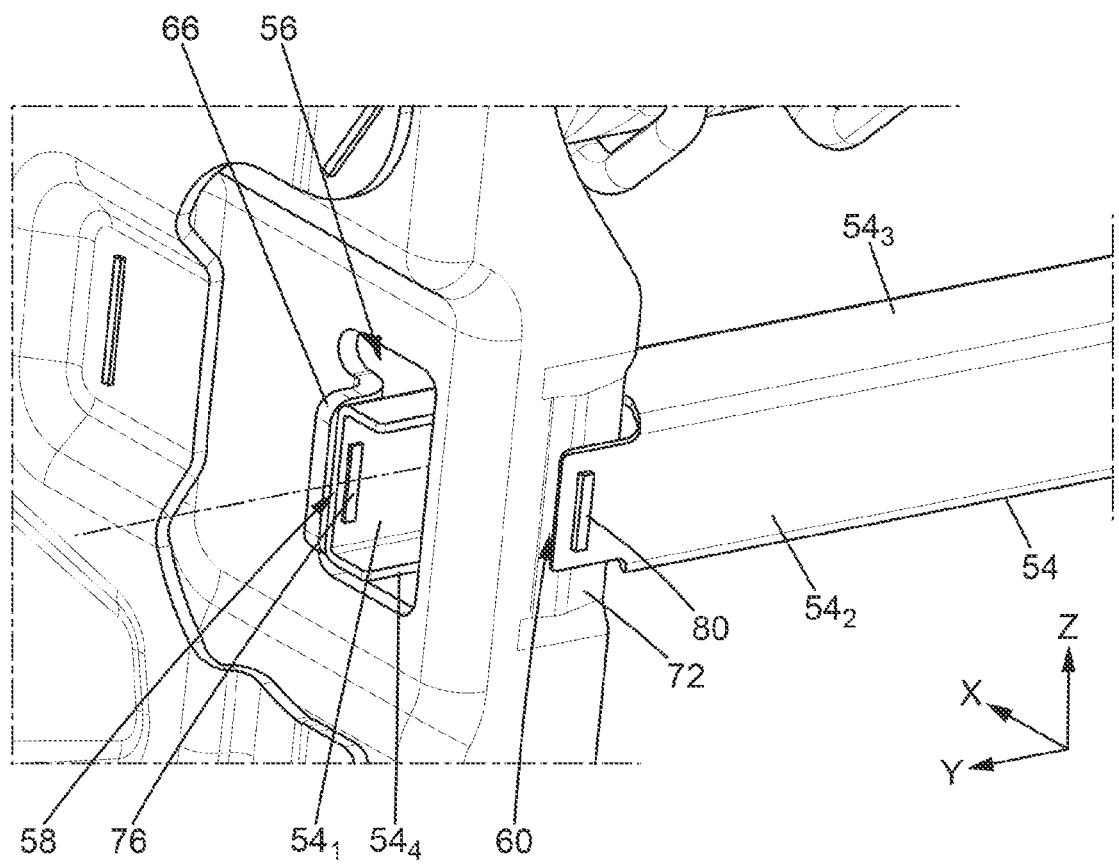
FIG. 4 shows a perspective view of details of the backrest of FIG. 2.

As is more particularly visible in FIG. 4, a first end 58, here a free end, of a first side $54_1$ of the tube 54 is offset along the direction of the longitudinal axis A5 of the tube 54, relative to a second end 60, here a free end, of a second side $54_2$ of the tube 54, the first and second sides $54_1$, $54_2$ being parallel. The first 58 and second 60 ends of sides $54_1$, $54_2$ are in the vicinity of a same longitudinal end of the tube 54. Thus, here the second side $54_2$ is shorter than the first side $54_1$, in the direction of the longitudinal axis A5 of the tube 54, in the vicinity of the longitudinal end of the tube 54 considered.

Figure 5:
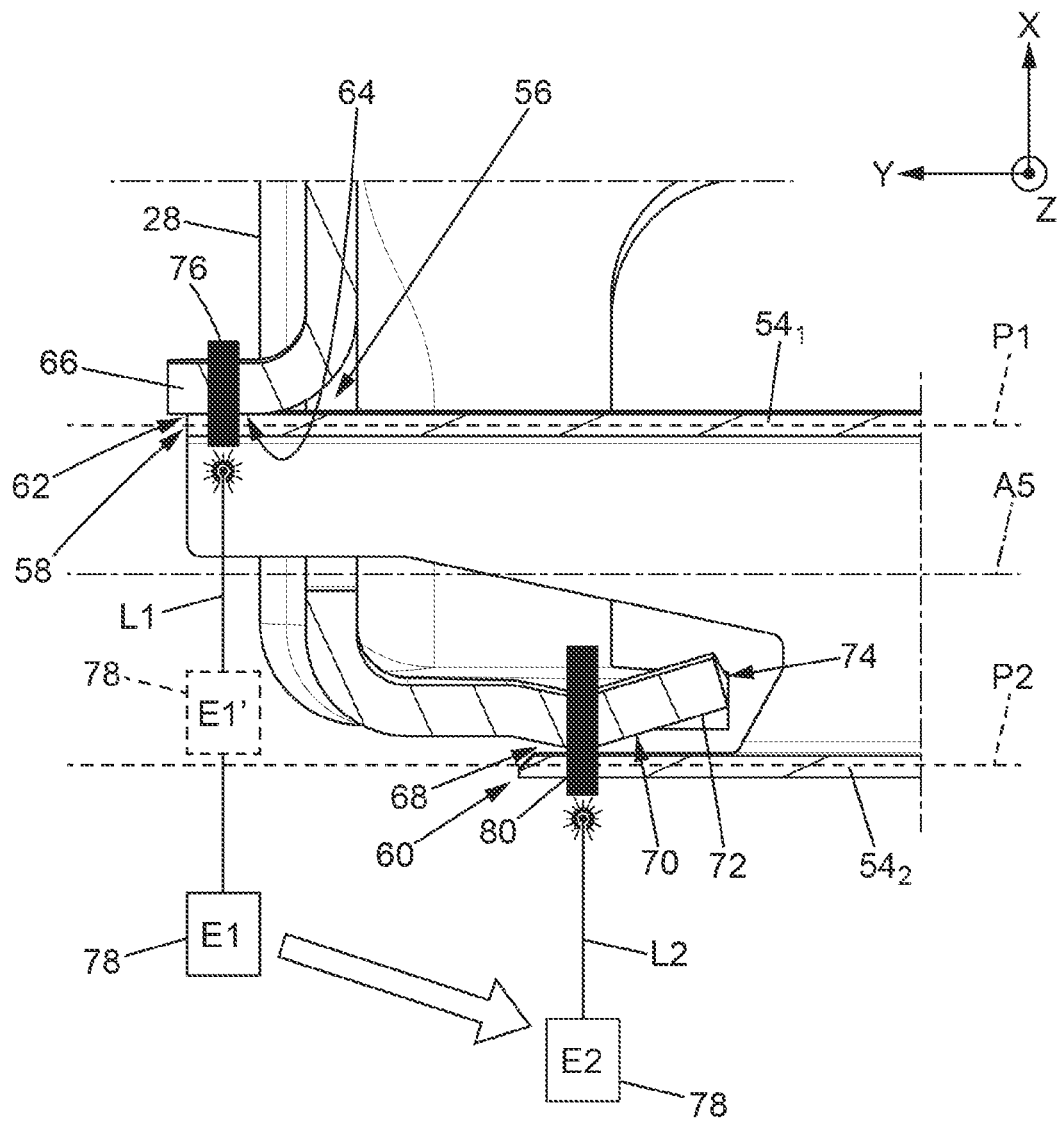
FIG. 5 shows a section view of the details of the backrest illustrated in FIG. 4.

As is particularly visible in FIG. 5, near the first end 58, the tube 54 and the hinge gusset plate 28 define a first area of contact 62 of the first side $54_1$ with a first surface 64 of the hinge gusset plate 28. Here, the first surface 64 is the surface facing the tube 54, of a tongue 66 extending from an edge of the hole 56. The tongue 66 extends substantially perpendicularly to the remainder of the hinge gusset plate 28, near the hole 56.

Near the second end 60, the tube 54 and the hinge gusset plate 28 define a second area of contact 68 of the second side $54_2$ with a second surface 70 of the hinge gusset plate 28. Here, the second surface 70 of the hinge gusset plate 28 is the surface of a ramp 72 extending from the vicinity of the hole 56. The ramp 72 and the tongue 66 extend here one on either side of the hole 56, along the direction of the longitudinal axis A5 of the tube 54. In other words, the ramp 72 and the tongue 66 extend in two opposite directional orientations, from the vicinity of the hole 56 in the hinge gusset plate 28. Viewed in the cross-section of FIG. 5, the ramp 72 is inclined in the direction of the first side $54_1$ of the tube 54, near its end 74 furthest from the hole 56, here a free end.

As is particularly visible in FIG. 5, the first and second areas of contact 62, 68 are offset along the direction of the longitudinal axis A5 of the tube 54. In addition, the gusset plate 28 and the tube 54 are shaped here so that the first side $54_1$ of the tube 54 is not covered on its face opposite the face in contact with the tongue 66. Thus, as illustrated in FIG. 5 in particular, it is possible to create a first laser weld 76 between the first side $54_1$ and the tongue 66 by means of a laser 78, then a second laser weld 80 between the second side $54_2$ of the tube 54 and the ramp 72 of the hinge gusset plate 28 with the same laser 78, kept within a same half-space delimited by the extension plane P1 of the first side $54_1$ or the extension plane P2 of the second side $54_2$ of the tube 54. In other words, the tube 54 and the gusset plate 28 are shaped so that the first and second areas of contact 62, 68, can be reached by a laser beam emitted from a same half-space delimited by an extension plane of the second side $54_2$.

Thus, for example, the first weld 76 is created by placing the laser 78 in a first position E1 located perpendicularly to the first side $54_1$ of the tube 54, in the half-plane delimited by the extension plane P2 of the second side $54_2$ of the tube 54. Once the first weld 76 has been created, the laser 78 is moved to a second position E2 located perpendicularly to the second side $54_2$ of the tube 54, at the second area of contact 68, in order to create the second weld 80 there. Advantageously, the movement of the laser 78 from the first position E1 to the second position E2 is carried out while always keeping the laser 78 in an orientation allowing the emission of a laser beam normal to the first and/or the second sides $54_1$, $54_2$ of the tube 54. In other words, the laser 78 is moved from the first position E1 to the second position E2, by translational movement(s), preferably along one or more straight lines. The corresponding movement is advantageously devoid of any relative rotation of the assembly of the tube 54 with the hinge gusset plate 28.

It should be noted that according to the example illustrated in FIG. 5, the face of the first side $54_1$ in contact with the tongue 66 and the face of the second side $54_2$ in contact with the ramp 72 have the same orientation. We define here the orientation of a surface, by the direction and the directional orientation of a normal to this surface. Thus, here, these two faces are oriented in a direction perpendicular to the axis A5 of the tube 54, facing the same way (here towards the top of FIG. 5). With such an orientation of the faces of the first and second sides $54_1$, $54_2$ in contact with the hinge gusset plate 28, it is possible to create the first and second welds 78, 80 with an incident laser beam, each time striking a side $54_1$, $54_2$ of the tube 54. This makes it possible to obtain a better quality of laser welding because the laser beam strikes the thinnest part. Here, in fact, the sides $54_1$, $54_2$ of the tube 54 are thinner than the sheet metal from which the hinge gusset plate 28 is formed.

Alternatively, the first position E1' of the laser 78 for the creation of the first weld 76 is located between the extension plane P1 of the first side $54_1$ of the tube 54 and the extension plane P2 of the second side $54_2$ of the tube 54. In this case, the two positions E1', E2 of the laser 78 for the creation of the two welds 76, 80 are within a same half-space delimited by the extension plane P1 of the first side $54_1$ of the tube 54.

In both cases, the two welds 76, 80 can be made while keeping unchanged the orientation of the laser 78 relative to the tube 54. This is particularly practical for implementing the assembly of the tube 54 with the hinge gusset plate 28. Indeed, it is then possible to create the two welds 76, 80 at the same station of a production line, without having to pivot the laser 78 relative to the tube 54.

The first and second welds 76, 80 are for example parallel.

In the following, an example 100 of a method of producing a backrest 18 as described above is described in more detail, with reference to FIGS. 5 to 8.

The method 100 of producing a backrest 18 comprises, according to the example of FIG. 6, a first step 102 consisting of providing on the one hand at least two uprights 42, an upper crosspiece 44 and/or a lower crosspiece 46 which are intended to form the backrest frame 20, and, on the other hand, two hinge gusset plates 28 and a tube 54 which are intended to form the base 22. A metal plate 50 intended to be integrated into the backrest frame 20 may also be provided in this first step 102.

During a second step 104, the tube 54 is inserted into the hole 56 of at least one of the two hinge gusset plates 28, as shown in FIG. 7. Preferably, during this second step 104, the tube 54 is preferably inserted into the two hinge gusset plates 28, a respective longitudinal end of the tube 54 being inserted into a hole 56 of each hinge gusset plate 28.

Once the tube 54 is inserted into a hole 56 of a hinge gusset plate 28, the tube 54 and the hinge gusset plate 28 define a first area of contact 62 of a first side $54_1$ with a first surface 64 of the hinge gusset plate 28. Here, the first surface 64 is the surface, facing the tube 54, of a tongue 66 extending from an edge of the hole 56. The tongue 66 extends substantially perpendicularly to the remainder of the hinge gusset plate 28, near the hole 56.

Similarly, the tube 54 and the hinge gusset plate 28 then also define a second area of contact 68 of a second side $54_2$ with a second surface 70 of the hinge gusset plate 28, near a second end 60 of the second side $54_2$. Here, the second surface 70 of the hinge gusset plate 28 is the surface of a ramp 72 extending from the vicinity of the hole 56. Here the ramp 72 and the tongue 66 extend one on either side of the hole 56, along the direction of the longitudinal axis A5 of the tube 54. The ramp 72 is inclined in the direction of the first side $54_1$ of the tube 54, near its end 74 furthest from the hole 56, here a free end.

The ramp 72 ensures contact between the second surface 70 of the gusset plate 28 and the second side $54_2$ of the tube 54, despite the manufacturing tolerances of the tube 54 and the hinge gusset plate 28.

The first and second areas of contact 62, 68 are offset along the direction of the longitudinal axis A5 of the tube 54. In addition, the gusset plate 28 and the tube 54 are shaped here so that the first side $54_1$ of the tube 54 is not covered on its face opposite the face in contact with the tongue 66. Thus, the first and second areas of contact 62, 68 can be reached by a laser beam emitted by a laser located in a same half-space, delimited by the extension plane of the first side $54_1$ or the second side $54_2$ of the tube 54.

Advantageously, during this second step 104, the two uprights 42, the upper crosspiece 44 and/or the lower crosspiece 46, and the metal plate 50 where applicable, are also assembled together, so as to form a preliminary assembly of the backrest frame 20. In this preliminary assembly of the backrest frame 20, the two uprights 42, the upper crosspiece 44 and/or the lower crosspiece 46, and the metal plate 50 if applicable, are assembled together but are not fixed together, at least not permanently fixed together.

During a third step 106, a first laser weld 76 is created by emitting a first laser beam L1 with a laser 78 in a first position E1, in the direction of the first area of contact 62. Advantageously, the first laser beam L1 has a direction of incidence that is substantially normal to the first area of contact 62. One will note here that the first position E1 of the laser 78 is within the half-space delimited by the extension plane P2 of the second side $54_2$ of the tube 54, not comprising the first side $54_1$.

During a fourth step 108, the laser 78 is moved relative to the assembly formed by the tube 54 received in each hinge gusset plate 28, to a second position E2 of the laser 78. It is noteworthy that the first and second positions E1, E2 of the laser 78 are within the same half-space delimited by the extension plane P2 of the second side $54_2$ of the tube 54, not comprising the first side $54_1$. Thus, advantageously, it is possible during all of the fourth step 108 to keep the laser 78 within the same half-space delimited by the extension plane P2 of the second side $54_2$ of the tube 54, not comprising the first side $54_1$.

During this fourth step 108, it is also advantageous to move the laser 78 relative to the tube 54 and each hinge gusset plate 28 only by translational movement(s), without any relative rotation of the laser 78 with respect to the tube 54. Such a displacement only by translational movement(s) is more easily achievable than a displacement including at least one relative rotation. Such displacement only by translational movement(s) may in particular be easily carried out on the same station of an assembly line. Furthermore, such a displacement only by translational movement(s) limits the adjustments necessary between the creation of the two welds with the laser 78. In particular, it is unnecessary in principle to readjust the focal length of the laser 78 after such a movement.

During a fifth step 110, a second laser weld 80 is created by emitting a second laser beam L2 with the laser 78 from the second position E2, in the direction of the second area of contact 68. Advantageously, the second laser beam L2 has a direction of incidence substantially normal to the second area of contact 62.

The first and second laser welds 76, 80 are for example parallel.

Finally, during a sixth step 112, the two uprights 42, the upper crosspiece 44 and/or the lower crosspiece 46, and the metal plate 50 if applicable are fixed together. This sixth step 112 may in particular include or even consist of the creation of laser welds 82. Advantageously, here, these laser welds 82 are created with the same laser 78 as for the first and second welds 76, 80, the laser 78 being kept within the same half-space delimited by the extension plane P2 of the second side $54_2$ of the tube 54, not comprising the first side $54_1$. During this sixth step 112, it may be particularly advantageous to move the laser 78, relative to the backrest 81 ready for welding, by translational movement(s) only. Here, each time, the laser beam emitted by the laser 78 is directed onto the metal plate 50 whose thickness is less than the thickness of the walls of the two uprights 42, of the upper crosspiece 44 and/or of the lower crosspiece 46 to which the metal plate 50 is fixed by laser welding. Welds 82 of better quality are thus created.

FIG. 9 illustrates a second example of the assembly of a tube 54 in a frame part 28 of a vehicle seat 10. This second exemplary assembly differs from the first assembly described above in that the tube 54 is arranged, in a direction perpendicular to the axis A5 of extension of the tube 54, between two tongues 66, 84 extending, in the section view of FIG. 9, substantially parallel to the axis A5 of extension of the tube 54, from the edge of the hole 56 in the hinge gusset plate 28.

Near the first end 58, the tube 54 and the hinge gusset plate 28 define a first area of contact 62 of the first side $54_1$ with a first surface 64 of the hinge gusset plate 28. Here, the first surface 64 is the surface, facing the tube 54, of a tongue 66 extending from an edge of the hole 56. The tongue 66 extends substantially perpendicularly to the rest of the hinge gusset plate 28, near the hole 56.

Near the second end 60, the tube 54 and the hinge gusset plate 28 define a second area of contact 68 of the second side $54_2$ with a second surface 70 of the hinge gusset plate 28. Here, the second surface 70 of the gusset plate 28 is the surface of a second tongue 84, extending from the vicinity of the hole 56. The first and second tongues 66, 84 extend here one on either side of the hole 56, along the direction of the longitudinal axis A5 of the tube 54. In other words, the first and second tongues 66, 84 extend in two opposite directional orientations, from the vicinity of the hole 56 in the hinge gusset plate 28. Here, the first and second tongues 66, 84 are substantially parallel.

As in the first example, the first and second areas of contact 62, 68 are offset along the direction of the longitudinal axis A5 of the tube 54. In addition, here the gusset plate 28 and the tube 54 are shaped so that the first side $54_1$ of the tube 54 is not covered on its face opposite the face in contact with the tongue 66. Thus, it is possible to create a first laser weld 76 between the first side $54_1$ and the tongue 66 by means of a laser 78, then a second laser weld 80 between the second side $54_2$ of the tube 54 and the second tongue 84 of the hinge gusset plate 28 with the same laser 78, kept within a same half-space delimited by the extension plane P1 of the first side $54_1$ or the extension plane P2 of the second side $54_2$ of the tube 54.

Thus, also in this example, the tube 54 and the gusset plate 28 are shaped so that the first and second areas of contact 62, 68 are reachable by a laser beam emitted from a same half-space delimited by an extension plane of the second side $54_2$.

Thus, for example, the first weld 76 is created by placing the laser 78 in a first position E1 located perpendicularly to the first side $54_1$ of the tube 54, within the half-plane delimited by the extension plane P2 of the second side $54_2$ of the tube 54. Once the first weld 76 has been created, the laser 78 is moved to a second position E2 located perpendicularly to the second side $54_2$ of the tube 54, at the second area of contact 68, in order to create the second weld 80 there. Advantageously, the movement of the laser 78 from the first position E1 to the second position E2 is carried out while always keeping the laser 78 in an orientation allowing the emission of a laser beam normal to the first and/or second sides $54_1$, $54_2$ of the tube 54. In other words, the laser 78 is moved from the first position E1 to the second position E2, by translational movement(s). The corresponding movement is advantageously devoid of any relative rotation of the assembly of the tube 54 with the hinge gusset plate 28.

Alternatively, the first position E1' of the laser 78 for the creation of the first weld 76 is located between the extension plane P1 of the first side $54_1$ of the tube 54 and the extension plane P2 of the second side $54_2$ of the tube 54. In this case, the two positions E1', E2 of the laser 78 for the creation of the two welds 76, 80 are within a same half-space delimited by the extension plane P1 of the first side $54_1$ of the tube 54.

Here, however, the face of the first side $54_1$ in contact with the tongue 66 and the face of the second side $54_2$ in contact with the second tongue 84 have opposite orientations. Here, these two faces are oriented in a direction perpendicular to the axis A5 of the tube 54, but facing in opposite directions.

As a result, the second laser weld 80 is created by means of an incident laser beam, impacting the surface of the second tongue 84 formed by the hinge gusset plate 28 and not the second side $54_2$ of the tube 54 as in the first exemplary assembly. By doing so, the second weld 80 may be significantly less resistant and/or more difficult to produce than in the context of the first exemplary assembly. On the other hand, however, the geometry of the tube 54 and of the hinge gusset plate 28 are significantly simpler.

The two welds 76, 80 may, however, be created while keeping the orientation of the laser 78 unchanged relative to the tube 54. This is particularly practical for implementing the assembly of the tube 54 with the hinge gusset plate 28. Indeed, it is then possible to create the two welds 76, 80 on a same station of a production line, without having to pivot the laser 78 relative to the tube 54.

The second exemplary assembly illustrated in FIG. 9 may be produced by implementing a method substantially identical to the one described above for producing the first exemplary assembly.

The present disclosure is not limited to the examples indicated above but is capable of numerous variants accessible to those skilled in the art.

In particular, in the examples described, the assembly described is that of a tube with a hinge gusset plate. Alternatively, the tube may be assembled to a flange. Such a flange rigidly connects the backrest frame to the seat support. The seat support may in particular be a movable profile of a slide or the floor of the passenger compartment. A similar assembly may be provided for a tube into any frame part. Such a frame part is advantageously made from a metal sheet, shaped in particular by stamping, bending, cutting, and/or any other process for shaping a metal sheet, accessible to those skilled in the art.

This description relates to a method for assembling a tube in a frame part of a vehicle seat, in particular of a motor vehicle seat. Also described is a method of manufacturing a vehicle seat backrest making use of this method for assembling a tube in a frame part of a vehicle seat. Also described is an assembly of a tube in a frame part of a vehicle seat, in particular of a motor vehicle seat, a backrest comprising such an assembly, and a vehicle seat, in particular a motor vehicle seat, comprising such a backrest.

A comparative vehicle seat backrest may be fix one or more crosspieces to elements forming all or part of the uprights of the seat frame. The comparative elements in question, hereinafter referred to as frame parts, may in particular be a flange or a gusset plate of a hinge mechanism. The crosspiece is for example formed by a tube of circular section. A square section tube is preferred, however, because such a tube is more rigid.

In one example, the comparative crosspiece is fixed to the frame part by MAG welding (for "Metal Active Gas"). To do this, the crosspiece may be inserted into a hole through the frame part. Then, near the end of the crosspiece, a MAG weld is made between the crosspiece and the frame part.

When the tube has a square section, two welds on two opposite faces of the tube may be used in order to provide good mechanical strength.

Although laser welding technology is generally preferred, it is difficult to implement as a replacement for MAG welding of the tube to the frame part. In this case, indeed, it is necessary to rotate the laser relative to the assembly formed by the tube and the frame part, in order to create the two welds. Such movement of the laser relative to the assembly of tube and frame part generally uses a change of station on the assembly line, which lengthens the manufacturing time of the seat and increases its cost.

This disclosure seeks to improve the situation.

To this end, a method is described for assembling a tube into a frame part of a vehicle seat, the method comprising the steps of:

i) providing a tube extending mainly along the direction of a longitudinal axis of the tube, an end portion of the tube being such that a first free end of a first side of the end portion is offset along the direction of the longitudinal axis of the tube, relative to a second free end of a second side of the end portion;

ii) providing a frame part in the form of a shaped metal plate;

iii) arranging the tube in contact with the frame part, so that:
   the first side of the end portion of the tube and a first surface of the frame part define a first area of contact of the tube with the frame part, near the first free end, and
   the second side of the end portion of the tube and a second surface of the frame part define a second area of contact of the tube with the frame part, near the second free end,
   the first and second areas of contact of the tube with the frame part being offset relative to each other, along the direction of the longitudinal axis of the tube;

iv) successively creating, by means of a same laser, a first weld at the first area of contact then a second weld at the second area of contact.

Thus, advantageously, the first and second contact surface, where the welds are made, can be more easily accessible by a laser beam.

According to preferred embodiments, the method comprises one or more of the following features, taken alone or in combination:
   at least the end portion of the tube is of polygonal section, in particular rectangular, more particularly square;
   the laser is moved between the first and the second weld within a half-space delimited by an extension plane of the first or second side;
   between the first weld and the second weld, the laser is moved relative to the tube and to the frame part, by translational movement(s) only;
   the first and second sides are parallel;
   the face of the first side in contact with the first surface and the face of the second side in contact with the second surface have the same orientation;
   the second surface is on a ramp of the frame part, the ramp being inclined relative to the direction of the longitudinal axis of the tube;
   the frame part has a hole in a face of the frame part, substantially normal to the direction of the longitudinal axis of the tube, the hole being shaped to receive at least one among the first free end of the first side of the tube and the second free end of the second side of the tube, the hole preferably being shaped to receive only one among the first free end of the first side and the second free end of the second side of the tube;
   the first and second surfaces extend one on either side of the hole, along the direction of the longitudinal axis of the tube;
   the ramp is divergent in the direction of insertion of the tube into the hole of the frame part;
   in step iii), a laser beam is emitted on a side of the tube each time, the thickness of the first and second sides of the tube being less than the thickness of the frame part at the first and second surfaces respectively; and
   the frame part is a flange or a hinge gusset plate, of a vehicle seat backrest.

According to another aspect, a method of manufacturing a vehicle seat backrest is described, comprising the steps of:
   a) providing at least two uprights, an upper crosspiece and/or a lower crosspiece, two frame parts, and a tube,
   b) assembling the tube to at least one among the two frame parts, by implementing a method as described above in all its combinations;
   c) assembling together the uprights, the upper crosspiece and/or the lower crosspiece, and the two frame parts.

Preferably, in step c), a plate is also fixed to the uprights and/or to the upper crosspiece and/or to the lower crosspiece, preferably by laser welding.

According to another aspect, also described is an assembly of a tube into a frame part of a vehicle seat, comprising:
   a tube extending mainly along a direction of a longitudinal axis of the tube, an end portion of the tube being such that a first end of a first side of the end portion is offset along the direction of the longitudinal axis of the tube, relative to a second end of a second side of the end portion,
   a frame part of a vehicle seat, in the form of a shaped metal plate, the frame part defining a first surface and a second surface which are distinct,
   the tube and the frame part being shaped to define a first area of contact of the first side with the first surface near the first end and a second area of contact of the second side with the second surface near the second end,
   the tube and the frame part being fixed together by laser welding at least at the first area of contact and at a second weld at the second area of contact.

According to preferred embodiments, the assembly comprises one or more of the following features, taken alone or in combination:
   the tube and the frame part are shaped so that the first area of contact of the first side with the first surface and the second area of contact of the second side with the second surface are reachable by a laser beam emitted from a same half-space delimited by an extension plane of the first or second side;
   at least the end portion of the tube is of polygonal section, in particular rectangular, more particularly square;
   the first and second sides are parallel;
   the first and second welds are parallel;
   the face of the first side in contact with the first surface and the face of the second side in contact with the second surface have the same orientation;
   the second surface is on a portion of the frame part forming a ramp, inclined relative to the direction of the longitudinal axis of the tube;
   the frame part has a hole in a face of the frame part, substantially normal to the direction of the longitudinal axis of the tube, the hole receiving at least one among the first end of the first side of the tube and the second end of the second side of the tube, the hole preferably receiving only one among the first end of the first side and the second end of the second side of the tube;
   the first and second surfaces extend one on either side of the hole, along the direction of the longitudinal axis of the tube; and
   the frame part is a flange of a backrest or a gusset plate of a hinge of a vehicle seat backrest.

According to another aspect, a vehicle seat backrest is described, comprising at least two uprights, and an upper crosspiece and/or a lower crosspiece, two frame parts, and a tube assembled together, at least one frame part and the tube forming an assembly as described above, in all its combinations.

According to yet another aspect, a vehicle seat is described comprising a seating portion and a backrest as described above, in all its combinations, the backrest being fixed to the seating portion.

A method for assembling a tube (54) into a frame part (28) of a vehicle seat (10) comprises the steps of:

i) providing a tube (54) such that a first free end (58) of a first side (54i) of an end portion of the tube (54) is offset longitudinally relative to a second free end (60) of a second side (54₂) of the end portion;

ii) providing a frame part (28) in the form of a metal plate;

iii) arranging the first and second free ends (58; 60) of the tube (54) in contact with the frame part (28), in two longitudinally offset areas of contact; and iv) successively creating, by means of a same laser (78), a weld (76; 80) at the first and second areas of contact (62; 68).

The invention claimed is:

1. A method for assembling a tube into a frame part of a vehicle seat, the method comprising the steps of:
  i) providing the tube extending mainly along a direction of a longitudinal axis of the tube, an end portion of the tube being such that a first free end of a first side of the end portion is offset along the direction of the longitudinal axis of the tube, relative to a second free end of a second side of the end portion;
  ii) providing the frame part in the form of a shaped metal plate;
  iii) arranging the tube in contact with the frame part, so that:
    the first side of the end portion of the tube and a first surface of the frame part define a first area of contact of the tube with the frame part, near the first free end, and
    the second side of the end portion of the tube and a second surface of the frame part define a second area of contact of the tube with the frame part, near the second free end,
  the first and second areas of contact of the tube with the frame part being offset relative to each other along the direction of the longitudinal axis of the tube;
  iv) successively creating, by means of a same laser, a first weld at the first area of contact then a second weld at the second area of contact,
  wherein at least the end portion of the tube is of polygonal section.

2. The method of claim 1, wherein the laser is moved between the first and the second weld within a half-space delimited by an extension plane of the first side or the second side.

3. The method of claim 1, wherein, between the first weld and the second weld, the laser is moved relative to the tube and to the frame part by translational movement(s) only.

4. The method of claim 1, wherein the first and second sides are parallel.

5. The method of claim 1, wherein a face of the first side in contact with the first surface and a face of the second side in contact with the second surface have a same orientation.

6. The method of claim 1, wherein the second surface is on a ramp of the frame part, the ramp being inclined relative to the direction of the longitudinal axis of the tube.

7. The method of claim 1, wherein the frame part has a hole in a face of the frame part, substantially normal to the direction of the longitudinal axis of the tube, the hole being shaped to receive at least one among the first free end of the first side of the tube and the second free end of the second side of the tube.

8. The method of claim 7, wherein the first and second surfaces extend one on either side of the hole, along the direction of the longitudinal axis of the tube.

9. The method of claim 5, wherein the second surface is on a ramp of the frame part, the ramp being inclined relative to the direction of the longitudinal axis of the tube, wherein the frame part has a hole in a face of the frame part, substantially normal to the direction of the longitudinal axis of the tube, the hole being shaped to receive at least one among the first free end of the first side of the tube and the second free end of the second side of the tube, and wherein the ramp is divergent in the direction of insertion of the tube into the hole of the frame part.

10. The method of claim 1, wherein, in step iii), a laser beam is emitted on a side of the tube each time, the thickness of the first and second sides of the tube being less than the thickness of the frame part at the first and second surfaces, respectively.

11. The method of claim 1, wherein the frame part is one among a flange and a hinge gusset plate, of a backrest of a vehicle seat.

12. A method of manufacturing a backrest of a vehicle seat, comprising the steps of:
  a) providing at least two uprights, at least one among an upper crosspiece and a lower crosspiece, two frame parts, and a tube,
  b) assembling the tube to at least one among the two frame parts, by implementing a method according to claim 1;
  c) assembling together the at least two uprights, the at least one among the upper crosspiece and the lower crosspiece, and the two frame parts.

13. The method of claim 12, wherein in step c), a plate is also fixed to at least one among the at least two uprights, and the at least one among the upper crosspiece and the lower crosspiece.

14. An assembly of a tube into a frame part of a vehicle seat, the assembly comprising:
  a tube extending mainly along a direction of a longitudinal axis of the tube, an end portion of the tube being such that a first end of a first side of the end portion is offset along the direction of the longitudinal axis of the tube, relative to a second end of a second side of the end portion,
  a frame part of the vehicle seat, in the form of a shaped metal plate, the frame part defining a first surface and a second surface which are distinct,
  the tube and the frame part being shaped to define a first area of contact of the first side with the first surface near the first end and a second area of contact of the second side with the second surface near the second end,
  the tube and the frame part being fixed together by a laser welding at least at the first area of contact and at a second weld at the second area of contact,
  wherein at least the end portion of the tube is of polygonal section.

15. The assembly of claim 14, wherein the tube and the frame part are shaped so that the first area of contact of the first side with the first surface and the second area of contact of the second side with the second surface are reachable by a laser beam emitted from a same half-space delimited by an extension plane of the first or second side.

16. The assembly of claim 14, wherein the first and second sides are parallel.

17. The assembly of claim 14, wherein the first and second welds are parallel.

18. The assembly of claim 14, wherein a face of the first side in contact with the first surface and a face of the second side in contact with the second surface have a same orientation.

19. The assembly of claim 14, wherein the second surface is on a portion of the frame part forming a ramp, inclined relative to the direction of the longitudinal axis of the tube.

20. The assembly of claim 14, wherein the frame part has a hole in a face of the frame part, substantially normal to the direction of the longitudinal axis of the tube, the hole receiving at least one among the first end of the first side of the tube and the second end of the second side of the tube.

21. The assembly of claim 20, wherein the first and second surfaces extend one on either side of the hole, along the direction of the longitudinal axis of the tube.

22. The assembly of claim 14, wherein the frame part is one among a flange of a backrest and a gusset plate of a hinge of a backrest of the vehicle seat.

23. A backrest of a vehicle seat, comprising at least two uprights, at least one among an upper crosspiece and a lower crosspiece, two frame parts, and a tube assembled together, at least one of the two frame parts and the tube forming an assembly of the tube in the at least one of the two frame parts of the vehicle seat backrest, the assembly comprising:

the tube extending mainly along a direction of a longitudinal axis of the tube, an end portion of the tube being such that a first end of a first side of the end portion is offset along the direction of the longitudinal axis of the tube, relative to a second end of a second side of the end portion, the at least one of the two frame parts of the vehicle seat backrest, in the form of a shaped metal plate, the at least one of the two frame parts defining a first surface and a second surface which are distinct, the tube and the at least one of the two frame parts being shaped to define a first area of contact of the first side with the first surface near the first end and a second area of contact of the second side with the second surface near the second end, the tube and the at least one of the two frame parts being fixed together by a laser welding at least at the first area of contact and at a second weld at the second area of contact.

24. A vehicle seat comprising a seating portion and a backrest according to claim 23, the backrest being fixed to the seating portion.

* * * * *